(12) United States Patent  
Smith (10) Patent No.: US 6,400,892 B1  
(45) Date of Patent: Jun. 4, 2002

(54) ADAPTIVE DISK DRIVE OPERATION

(75) Inventor: Gordon J. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/227,549

(22) Filed: Jan. 11, 1999

(51) Int. Cl.[7] .............................................. H04N 5/781
(52) U.S. Cl. ........................... 386/125; 386/96; 386/95
(58) Field of Search ............................... 360/73.03, 48; 386/95, 96, 125–126, 46; 369/32, 48; H04N 5/781

(56) References Cited

U.S. PATENT DOCUMENTS

| 4,514,771 A | | 4/1985 | Stark et al. ................... 360/73 |
| 4,780,866 A | * | 10/1988 | Syracuse ...................... 369/59 |
| 4,910,670 A | | 3/1990 | Smith et al. ................ 364/200 |
| 5,309,249 A | * | 5/1994 | Ishii ............................ 358/342 |
| 5,408,331 A | * | 4/1995 | Ota ............................. 358/341 |
| 5,499,221 A | * | 3/1996 | Ito et al. ........................ 369/32 |
| 5,659,799 A | | 8/1997 | Wu et al. .................... 395/877 |
| 5,712,949 A | * | 1/1998 | Kato et al. ..................... 386/96 |
| 5,764,430 A | | 6/1998 | Ottesen et al. ........... 360/73.03 |
| 5,787,292 A | | 7/1998 | Ottesen et al. ......... 395/750.01 |
| 6,075,665 A | * | 6/2000 | Chainer et al. ................ 360/48 |
| 6,215,609 B1 | * | 4/2001 | Yamashita et al. ........ 360/73.03 |

FOREIGN PATENT DOCUMENTS

| JP | 53-120411 | 10/1978 | ........... G11B/5/033 |
| JP | 04-186563 | 7/1992 | ........... G11B/20/10 |
| JP | 04-366462 | 12/1992 | ........... G11B/19/02 |
| JP | 06-208752 | 7/1994 | ........... G11B/19/02 |
| JP | 07-334950 | 12/1995 | ........... G11B/21/08 |

OTHER PUBLICATIONS

Anonymous, "High–Speed/Low–Power Selectable Optical File", Research Disclosure, Jul. 1990, p. 584.

* cited by examiner

*Primary Examiner*—Vincent Boccio  
(74) *Attorney, Agent, or Firm*—Christopher H. Lynt; Mark A. Hollingsworth (57) ABSTRACT

In storing data on a storage device, for example, a disk drive, it is determined what type of data is to be stored, distinguishing between normal data and slow data, such as audio data or text messages. Slow data is data which can be used effectively when retrieved at a relatively low storage medium speed. Slow data is further assigned to be stored at a predetermined location on the storage medium selected to avoid reliability problems due to the slower medium speed. Storing and retrieving such data at a slower medium speed from the assigned location increases drive efficiency by conserving power without compromising storage device reliability.

31 Claims, 7 Drawing Sheets

Minimum slider-to-disk clearance for a NPBS slider on a 3.5 inch disk

ADAPTIVE DISK DRIVE OPERATION

BACKGROUND OF THE INVENTION

1. Field of the Invention

The invention relates to the fields of disk drive operation and audio storage/playback, and in particular to controlling the operating speed of a disk drive when storing or retrieving data and choosing a disk location for storing the data, the choice of speed and disk location being based on the type of data being stored or retrieved, and the type of operation the retrieved data is used for, e.g., audio playback.

2. Background Information

Many modern electrical devices store and read data. For example, compact disk players read digitized audio data from a plastic disk storage medium with a laser. A video cassette recorder stores and reads audio and video data using magnetic tape as a storage medium. Computer systems are designed to read and store large amounts of data. A computer system will typically employ several types of storage devices, each used to store particular kinds of data for particular computational purposes. Electronic devices may use programmable read-only memory (PROM), random access memory (RAM), flash memory, magnetic tape or optical disks as storage medium components, but many devices, especially computers, store data in a direct access storage device (DASD) such as a hard disk drive.

Although such data storage is not limited to a particular direct access storage device, one will be described by way of example. A hard disk drive typically includes one or more circular magnetic disks as the storage media which are mounted on a spindle. The disks are spaced apart so that the separated disks do not touch each other. The spindle is attached to a motor which rotates the spindle and the disks, normally at a relatively high revolution rate, e.g., 5400 rpm. A disk controller activates the motor and controls the read and write processes which will now be described.

Storage of data on a magnetic disk storage medium entails magnetizing portions of the disk in a pattern which represents the data. In order to write the data onto the magnetic surface of the disk, a small generally ceramic block called a "slider" which contains a magnetic transducer is positioned over the traveling surface of the rotating disk. This transducer is also known as a write element or write head. The write element is typically "flown" at a height of approximately six millionths of an inch from the surface of the spinning disk.

Generally, before storing user data, the disk is formatted (also using the write head) so that its surface is organized into a series of identifiable locations on concentric tracks, according to known methods. As will be described later, the tracks may be further organized into groups of tracks forming a plurality of recording "zones." When a designated track location on the disk surface is under the write element, the write element is energized to various states by the disk controller, causing the track location below to be magnetized in a way representing the user data to be stored.

Reading recorded data from a magnetized disk is accomplished in a similar fashion. When a read element or read head is flown over the spinning disk, a signal is induced in the read element as it passes over previously magnetized portions of the disk where data has been recorded. To perform a read operation, the disk controller determines the location of the desired recorded data, moves the read head to that location, and captures a signal induced in the read element by the traveling disk when the read element is above the specified location. This induced signal corresponding to the originally recorded data is subsequently processed and the original data reconstructed from the signal induced in the read element. In some devices, the write element also acts as the read element while in others, separate and distinct write and read elements are used. These elements may be disposed on the same head assembly or separate head assemblies.

Generally, each of the head assemblies having the read/write elements of a disk drive are held and positioned by an actuator arm attached to a stepper motor which is directed by the disk drive controller to move the respective head assembly across the radius of the rotating disk from track to track. The elements must be controlled precisely so that the desired user data location is accurately found on the disk.

Further, serious malfunctions, including data loss and physical damage to the disk surface and/or read/write elements, can result if the read/write elements come in contact with data containing portions of the surface of the magnetic disk, especially while it is rotating at high speeds. Generally, a "landing zone," an area on the disk surface where no data will be written, is provided for the read/write elements to rest on when the disk device is powered down.

The use of disk drives in such devices as portable computers, personal digital assistants and cellular telephones, for example, has increased significantly over the past several years. Devices of this nature typically have a portable battery pack which provides power to the various components of the device when used away from a power outlet. It is important that the battery pack used to supply power to portable devices be compact and lightweight.

However, as portable devices are increasingly used in locations where an external power source is unavailable, for example, traveling on an airplane, it is also increasingly important that the portable devices operate for significant periods of time between recharging of the battery pack. Bigger batteries tend to provide longer use time however they increase the weight of the device. Hence, the desire to achieve a compact and light weight design often competes with a desire for longer usage time of the portable device between charging the battery pack.

In order to increase operating time in portable devices, various steps have been taken to reduce the power consumption of components used in the devices. Moreover, increased efforts have also been made to reduce power consumption in fixed devices, like desk-top computers, in order to more generally conserve energy resources. The Environmental Protection Agency (EPA) now provides for power saving status to be granted to computers meeting certain standards.

Thus, efforts to reduce power consumption of the various components of a computer have been increasingly employed. For example, the central processing unit (CPU) often includes some form of power management function to reduce clock frequency of the CPU when the computer enters a power saving mode, and may act to place various components into a sleep mode where reduced power is used. In general, a power saving mode may be invoked to reduce use of power by a component of the computer when the component is not being used.

In the case of memory storage devices, various power saving techniques have been employed. For example, in disk drives, the spindle motor which rotates the disk storage media uses a large percentage of the total power of the disk drive. In order to conserve power, it has been proposed that the spindle speed of the disk drive be reduced or stopped when the disk drive is not being used. As will be discussed later, depending on head design, reducing spindle speed can adversely affect disk drive reliability if adequate precautions are not taken.

In a typical approach, a normal operating spindle velocity is used by the disk drive during read and write operations to the disk. When the power saving mode is initiated, for example when the disk drive is not accessed for a predetermined period of time, the spindle velocity of the disk is reduced or stopped to conserve power. When an access operation to the disk drive is initiated, the spindle speed is increased until the disk is rotated at the normal operating velocity prior to beginning the read or write operation. In other words, the power saving mode is disengaged and the disk brought up to operational RPM prior to commencement of read and write operations.

A further known technique for conserving storage device power is to use the lightest/smallest possible storage medium, e.g., disks. However, this results in an increased total storage requirement, overall storage density, for the disk. One technique used to achieve the increased storage is called zone bit recording (ZBR). With a constant disk velocity measured in RPM, the linear speed of the disk as it moves past the transducer (head) varies with the diameter of the disk. The linear velocity is, of course, higher at outer diameters than at inner diameters of the disk, since the circumference of the disk increases with the diameter. The length of the concentric tracks increases with diameter.

ZBR takes advantage of this property by dividing the disk surface into a plurality of zones based on diameter, and increasing the frequency in a particular zone at which data is recorded to the disk, from an inner diameter zone to an outer diameter zone. This increases the linear density (bits per unit length) of the recorded data in each zone so that it approaches a maximum density limit for the particular disk media used. The maximum density limit depends primarily on the physical properties of type of medium material used.

Thus, with ZBR, the total storage is increased over the case where the disk is essentially one zone and none of the increased density potential of the outer diameters is utilized.

U.S. Pat. No. 5,787,292, describes a multiple frequency zoned disk storage device, in which data is further read from and/or written to the disk at two or more discrete disk velocities. A low power mode is described where information is read/written from/to the disk while the disk velocity is reduced to conserve power. An embodiment of the described device incorporates zone bit recording such that when one of the different disk motor speeds is used for write operations, an appropriate write frequency for a particular zone is selected such that the linear density approaches the maximum possible for the media used. In other words, the disk rotation speed adjustment for low power mode is factored into the selection of the write frequency for a particular zone.

The patent also describes an activity monitor which detects requests for disk read/write activity, and can cause the disk spindle motor speed to be reduced to conserve energy after a certain period of inactivity. However, because the disk, spindle and motor all have mass, the speed cannot be changed instantaneously. Therefore, in order to reduce any waiting time while changing speeds, the patent further provides that if a high disk activity is anticipated (by a host computer, for example) for future operations, the spindle speed may be increased prior to initiation of such activity.

According to the particular type of activity anticipated, it is determined what level of disk activity will be required, e.g., very high, high, medium high, average, etc. For example, data base search operations or those heavily using graphics require relatively high disk activity. An appropriate disk controller operating frequency for the type of disk activity level can thereby be selected.

Further according to that patent, the activity monitor may also receive (from the host computer, for example) an indication of the type of data to be read from or written to the disk, and may use this indication to ensure that a satisfactory spindle speed is used for the type of information being read.

However, because of the continuing need for power conservation, further disk drive operation improvements would be useful and beneficial.

SUMMARY OF THE INVENTION

It is, therefore, a principle object of this invention to provide a method and apparatus for adaptive disk drive operation.

It is another object of the invention to provide a method and apparatus that solves the above mentioned problems so that disk drive power consumption and operation is further optimized.

These and other objects of the present invention are accomplished by the method and apparatus disclosed herein.

It should be noted that this invention is not limited to use in disk drives using magnetic media but is useful in any device having rotating or otherwise traveling media. In this particular application, where magnetic media is described as an example, it should be recognized that the invention would be useful in other storage devices which have different types of media or read and write elements.

When considering the above mentioned problems and needs for energy conservation, Applicant recognized that there is a lower data rate requirement for some kinds playback, and that the electrical power requirements of a hard disk drive could be reduced in those types of playbacks by reducing the rotational speed of the disks. For example, audio data, like phonemail or text messages, is relatively less data rate intensive than video data. That is, audio data can be played back audibly even though retrieved at a relatively low rate. Of course, the required effective rate of data retrieval depends on the way the data will be used. An audio file could be retrieved slowly for listening, but might require faster retrieval when being input into a spectral analysis program for processing, for example. Therefore, the way the data will be used also determines the "type" of data, for the purposes of selecting a required disk speed.

Applicant further recognized that altering the disk rotational speed could adversely affect the reliability of the drive unless suitable precautions are taken. For example, some drives are designed such that the flying height of the slider having the read and write elements changes when the speed of the disk changes. Advantageously, according to an aspect of the invention, the flying height of the slider is taken into account, along with the type of data being stored/retrieved from the disk, when reducing disk rotational speed to reduce power. The disk rotation speed is chosen accordingly, thereby avoiding any significant threats to disk drive reliability.

According to an aspect of the invention, the invention uses multiple disk speeds, which can be measured in revolutions per minute (RPM) and in terms of the linear (traveling) speed of the disk surface with respect to the read/write element, to maintain an adequate data rate while simultaneously reducing power consumption in hard disk drives. For example, phonemail can be received over a network at a high data rate and in a short period of time. However, when played back, the data rate can be significantly reduced because the data rate need only be high enough to support whatever audio decompression and digital-to-analog conversion is required to reproduce audio frequencies for listening.

According to another aspect of the invention, the particular instantaneous disk RPM being used for low speed operation can advantageously be adjusted when other demands are made on the disk drive. For example, if while listening to phonemail using a reduced disk RPM, new data which must be stored is received, the phonemail playback may be interrupted and the disk RPM increased to accommodate immediate storage of the new data at the standard disk RPM. Alternatively, according to another aspect the invention, this can be accomplished without interrupting phonemail playback by buffering either the new data or the phonemail. The new data could be buffered while the phonemail is played at the lower disk speed, and subsequently stored at the standard disk speed (RPM) after the phonemail playback is completed, for example. Alternatively, the disk speed could be increased to the standard disk speed, the as yet unplayed phonemail could be read into a buffer at the standard disk speed, and then the buffered phonemail played back from the buffer while the new data is being written to the disk at the standard disk speed.

According to another aspect of the invention, the location for the phonemail or other audio-type data that can use a lower data rate for playback is optimized so that at low disk RPM, a slider-to-disk distance, which can affect disk drive reliability, is not adversely affected.

According to another aspect of the invention, the invention does not preclude increasing the disk RPM for playback if needed for a particular application, for example, where the data being played back is video and a higher data rate may be required as compared with purely audio playback.

According to another aspect of the invention, phonemail can advantageously be saved on the disk drive at low disk RPM, which significantly reduces the power consumed by the disk drive, especially for long messages.

According to another aspect of the invention, phonemail is advantageously retrieved from the disk drive at low disk RPM which significantly reduces the power consumed by the disk drive, especially for long messages.

According to another aspect of the invention, different disk rotation speeds are advantageously used when recording and playing back certain audio information. This can be very useful for cellular phones, personal digital assistants (PDA), and other portable devices that rely on battery power, for example.

In a particular advantageous use in accordance with the above aspect of the invention, consider a cellular phone or PDA with an internal hard drive. Phonemail messages are received by the PDA and stored on the hard drive at the normal data rate and disk speed. The network phonemail is probably compressed and encrypted. A one minute phonemail message can be stored on the drive in a few seconds at most. Later, when the phone messages are played back, since the required data rate when listening to phonemail is lower, and might be only 1/100 of that used to store the messages, to conserve disk drive power, the disk speed (RPM) can be advantageously lowered. According to this aspect of the invention, the hard drive uses its maximum data rate and disk speed only when storing the network phonemail.

These and other aspects of the invention will become apparent from the detailed description set forth below.

DETAILED DESCRIPTION OF THE PREFERRED EMBODIMENTS

The invention will now be described in more detail by way of example with reference to the embodiments shown in the accompanying Figures. It should be kept in mind that the following described embodiments are only presented by way of example and should not be construed as limiting the inventive concept to any particular physical configuration.

Figure 1:
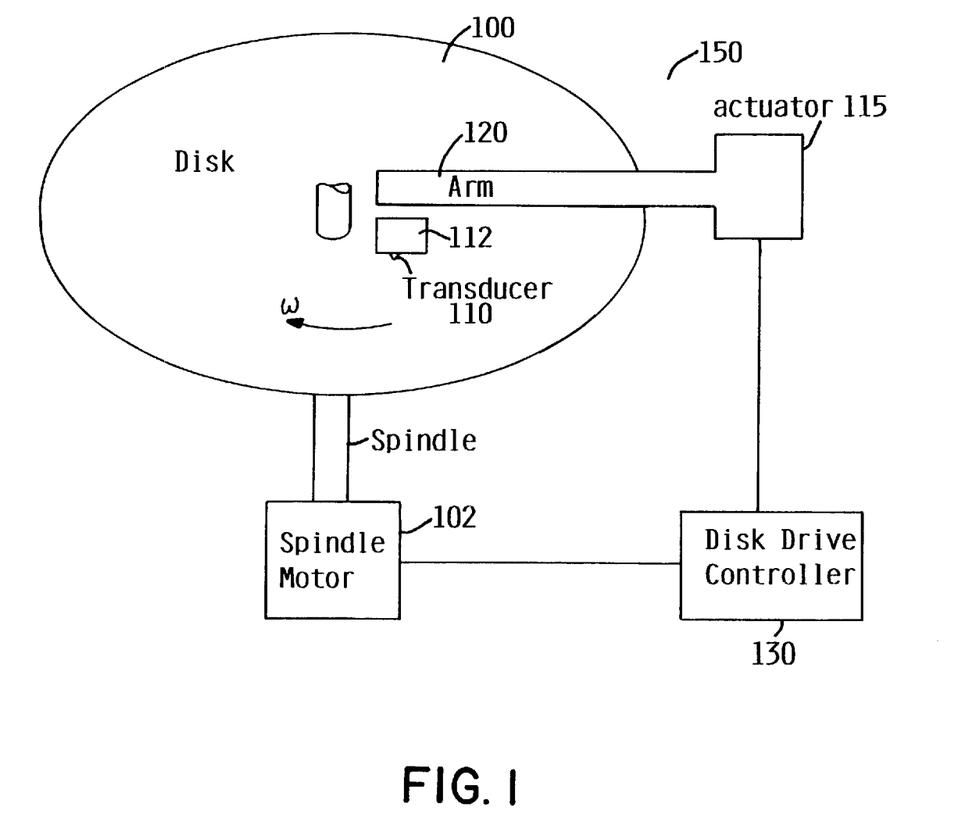
FIG. 1 illustrates a disk drive according to an exemplary embodiment of the present invention.

FIG. 1 depicts various components of a typical disk drive 150 for the purpose of illustrating various features of an exemplary embodiment of the present invention. In FIG. 1, a magnetic disk 100 is rotated by a spindle motor 102 at a velocity ω, which is normally either 3600 or 5400 RPM in the 2 ½" disk hard drives used in most laptop or notebook computers. A read and/or write transducer is attached to slider 112 which is held by arm 120 which is in turn positioned by an actuator 115 above the spinning disk. The actuator and spindle motor are controlled by disk drive controller 130. The disk drive controller 130 is normally embodied as hardware circuitry, including memory containing a control program executed by a processor. However, other embodiments of the controller are possible and the invention is not limited to any particular controller implementation.

Figure 2:
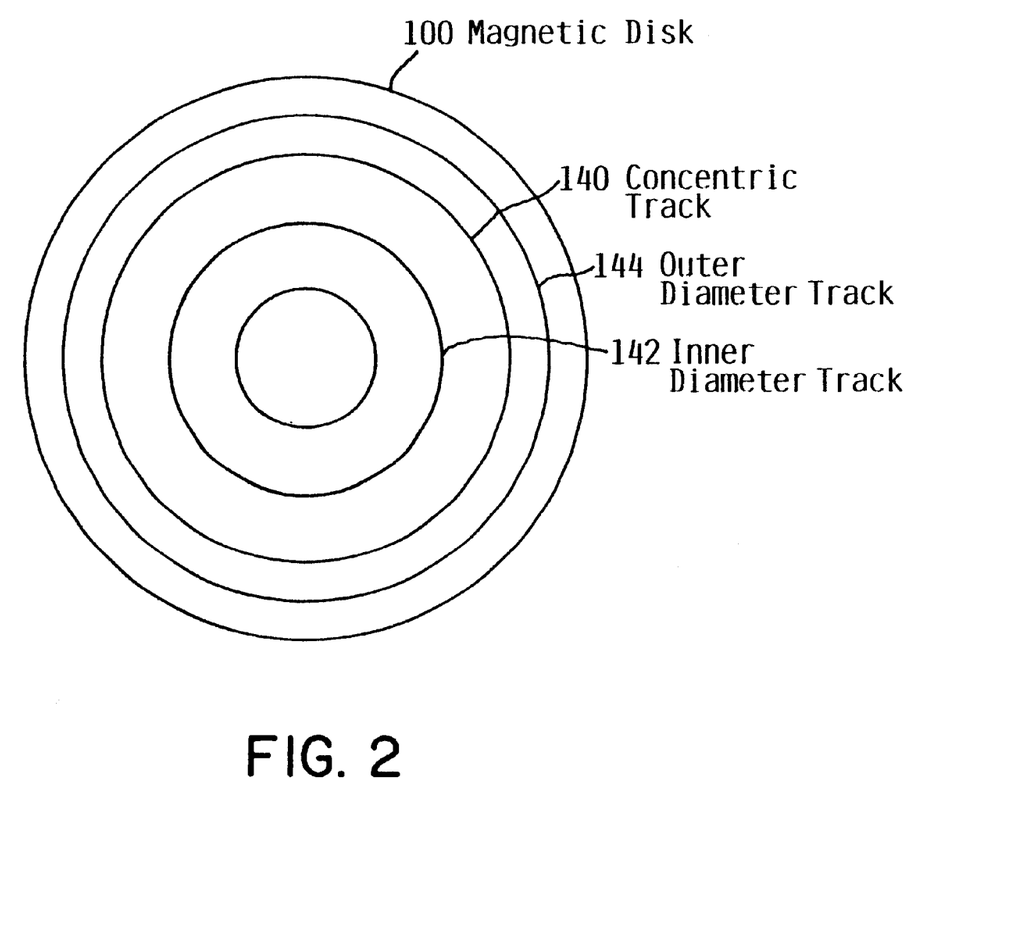
FIG. 2 illustrates a storage disk according to an exemplary embodiment of the invention.

As shown in FIG. 2, the magnetic disk 100 is mapped by the disk drive controller into a plurality of concentric tracks 140. The data being stored on the magnetic disk is written at a noted position within a designated track. Some inner tracks 142 are close to the inner diameter of the disk 100. Other outer tracks 144 are nearer the outer diameter of the disk 100. For a given disk rotational speed (RPM), the relative speed of the disk 100 with respect to the head 110, also referred to as the linear disk velocity and/or traveling speed, is greater at the outer diameter tracks 144. A landing zone (not shown) for resting the head 112 is typically provided at an inner-most diameter of disk 100 where no data is to be stored.

Memory devices, such as disk drives, are generally designed to maximize the rate at which data is stored or retrieved, however, the Applicant recognized that not all types of data require high speed storage and retrieval. Audio data, for example, can be stored on a memory device and recovered therefrom in less than one hundredth the time required to actually play the audio message to a listener in "real time." Similarly, a text message can be handled at a slowed rate. The effective speed (data rate) of a memory device, therefore, could be substantially slowed, theoretically to one hundredth normal, for the processing of these kinds of data without any perceptible denigration of system response.

As can be appreciated, data suitable for slowed transfers could be generated by and/or originate from a telephone connection, a network connection, other storage media, or by user manipulation.

However, some data suitable for slowed retrieval may not be suitable for slowed storage. Likewise, some data suitable for slowed storage may not be suitable for slow retrieval. For the purposes of the present invention, the minimum speed at which data can be stored is dependent on the maximum speed that the data becomes available to the storage device. For example, some data, such as digital data which arrives at too high a data rate for effective buffering, might require immediate storage at the normal disk drive speed. Other types of data, like a spoken telephone message, for example, could be effectively stored at half the normal disk drive speed, or less. Similarly, for the purposes of this invention, the minimum speed at which data can be retrieved and played back is dependent on the minimum data rate required to produce an effective replay.

As mentioned above, one method of reducing the power consumption of a disk drive is to slow or stop the spindle motor whenever feasible. The spindle motor consumes a large percentage of the disk drive power requirements. Interestingly, the disk drive will still function even when the spindle is slowed, within limits. That is, the drive can still store and retrieve data, although only at a slower rate. A slowed disk drive may advantageously consumes less power than a disk drive operated at a normal rate when used to read certain types of data, like audio data, or text messages, for example, which can be effectively read at a slowed rate.

It should be appreciated that power represents the rate of energy use. The total amount of energy used for any particular task equals the rate of energy use (power) times the length of time to complete the task. With this in mind, when reading certain types of data from a disk drive at a normal rate, it may be that the disk drive is wasting energy because the data cannot be used as fast as it can be read out. The disk drive is kept spinning at the normal speed, using energy at the normal rate, during the entire time that is required to use the data. (It is somewhat analogous to driving a Porsche at high speed block-to-block between red lights where it has to stop and wait. A Volkswagen bug, for example, would do better in terms of energy used under those circumstances. If gasoline were being rationed, one would be well advised to leave the Porsche in the garage.)

However, it should be appreciated that if the disk drive were slowed to a speed where the data is being read out at about the same speed it is being used, energy savings are realized. This is because the time required to use the data in both cases is the same, but the rate of energy use is lower at the slower speed. The energy use has essentially been optimized for the data type. (Using the Porsche/Volkswagen analogy, by the time one reaches the red light, it has turned green and there is no waiting.)

By the same token, it can be appreciated that if data is being read out at a rate slower than it could be used, energy may also be wasted, since the read out will take longer than the optimal time, and the total energy used is the product of the rate of energy use (power) and the total time.

Of course, in reality, one has to factor in the amount of energy used to get up to speed, which is naturally greater for higher disk speeds. One also has to understand that there are other factors which may temper or override the energy efficiency considerations. For example, drive reliability is affected by disk speed, as will be discussed later.

Further, most data channels commonly used with disk drives, for example, can accommodate a 2:1 data rate range. While reading data at lower rates, the disk rotation speed can be easily reduced by a factor of two. The normal data rate for a 2½" disk hard drive is typically less than twenty megabytes per second. In slowing the drive for playing phonemail, for example, a data rate of ten megabytes per second or less could be used. Therefore, according to the invention, a disk drive is made to function at a slowed rate when reading certain types of data, and this can be accommodated with typical data channels currently in use.

Because most, if not all, disk drives have not been specifically designed to operate optimally at more than one rate of rotation, the performance of the disk drives may change to one degree or another when the spindle motor is slowed. In most disk drives, for example, the flying height of the head may drop to an unacceptably low level, resulting in undue risk of a head crash into a data area on the disk surface in response to external vibrations.

Figure 3:
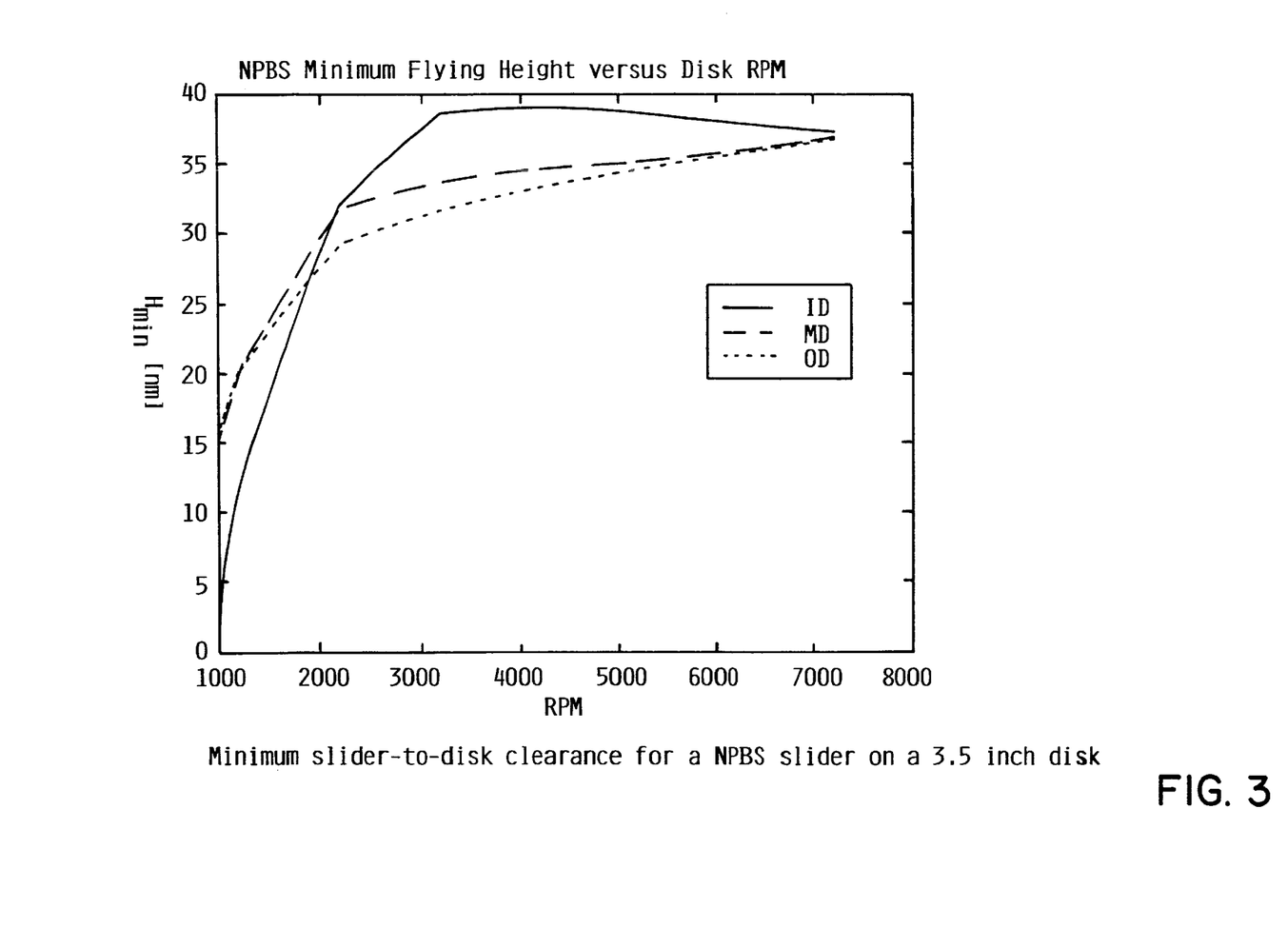
FIG. 3 illustrates a graph of the slider height of a negative pressure bobsled air-bearings at various rotational speeds according to an exemplary embodiment of the invention.

However, in a drive using negative pressure bobsled air-bearings (NPBS), for example, there are certain disk radii where the slider-to-disk clearance actually increases as the RPM is reduced. This effect is shown in FIG. 3, where the minimum slider-to-disk spacing in nanometers is shown on the vertical axis and the disk rotation in RPM is shown along the horizontal axis for a 3.5 inch disk using a NPBS slider.

Comparing 6000 RPM and 3000 RPM, for example, at the inner diameter (ID—solid line) radius of a 3.5 inch diameter disk, the clearance is 2 nanometers greater at one-half speed (3000 RPM). On the other hand, for the middle (MD) and outer (OD) diameters, there is a slight reduction in clearance between the same speeds.

Figure 4:
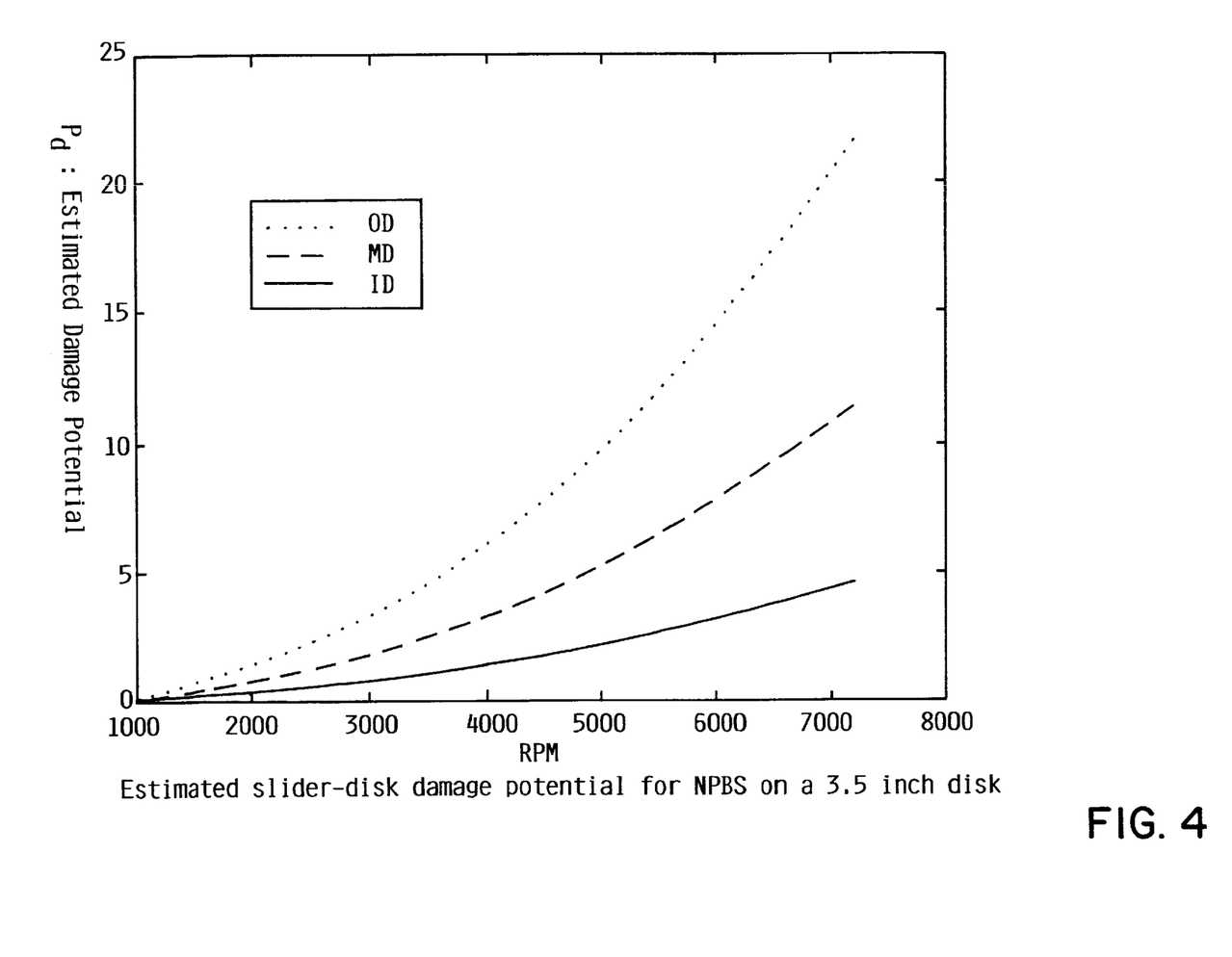
FIG. 4 illustrates a graph of the damage potential for negative pressure bobsled air-bearings at various rotational speeds according to an exemplary embodiment of the invention.

With reference to FIG. 4, the slider-to-disk interaction damage potential $P_d$ is a function of the slider height and the disk linear velocity for a slider with negative pressure bobsled air-bearings can be expressed as:

$$P_d = \tfrac{1}{2} V_d^{2} * d,$$

where $V_d$ is the linear disk velocity and d is the slider-to-disk clearance.

The damage potential $P_d$ thus decreases with lower RPM for the negative pressure bobsled air-bearing slider at all radii, even though the clearance may decrease at certain radii. It should be appreciated that, if there is a head crash, the higher the speed, the greater the potential damage since the forces are greater (assuming non-relativistic speeds):

$$f = ma \text{ (Newton)}.$$

However, the smallest $P_d$ occurs at the inner diameter (ID—solid line), as shown in FIG. 4, where linear disk velocity for a given RPM is lowest.

For any particular slider, there may be preferred locations for storing data at a slowed rate. Choice of these locations may depend on a variety of factors, including speed of operation, reliability, and/or other operational considerations.

Furthermore, the slider flying height is also a function of the particular air bearing geometry and skew, the angle between the longitudinal axis of the slider and the tangent angle at a given disk radius. Some sliders fly higher at the inner diameter (ID) than at the outer diameter (OD) at any disk speed.

By way of example, the choice of a preferred location for slower data storage could be based on a plot similar to FIG. 4 for a particular air-bearing, as would be apparent to one skilled in the art.

Further, from FIG. 4, it can be seen that the damage potential $P_d$ at ½ speed (3000 RPM) is about 5 times greater at the outer diameter (OD—dotted line) as compared to the inner diameter (ID—solid line).

The equation presented above for $P_d$ suggests that the disk RPM may be the dominant or controlling factor for damage potential for NPBS drive designs. It may safely be assumed that this is also the dominant factor for many other drive designs.

Data which can be retrieved slowly can be stored safely at disk locations which have a relatively greater potential for damage when the disk drive is operated at higher speeds, e.g., the outer diameter, indirectly improving potential reliability. Thus, according to the invention, data dependent disk operation may actually make a disk drive function more reliably, while also conserving energy.

In accordance with an embodiment of the invention, an electrical device, such as a host computer and/or a disk drive controller, receives/collects data and determines the type of data which has been received/collected. In the case of phonemail, the device could search all incoming data for the digital header or envelope which identifies the message as phonemail, for example.

If the data is of the kind which could be effectively read at a slow retrieval rate, e.g. audio data (e.g., phonemail) or text messages, the disk controller would store the data in a disk location determined to be optimal for retrieval from the disk drive at slowed disk drive rotation speeds. The data could be stored while the drive operated at a slowed rotation rate, or at a normal rotation rate.

If the data was of a type, like video data, which could not be effectively read at the slowed rotation rate, the disk controller would store the data in a disk location selected for the disk drive at the normal drive rotation speed.

In a wireless network environment, for example, data may be transmitted at either low or high bandwidths, depending on the network load. If the data rate being transmitted to the disk drive is low, the drive could be slowed to better match the incoming data rate.

When a user requests a retrieval of saved data, the disk controller examines the request to determine the type of data being requested. If the data request is for data which can be retrieved effectively at a lowered rate of speed, the spindle motor is slowed and the data read from the disk at the slower rotation speed. If the data request is for data which cannot be retrieved effectively at a lowered rate of rotation speed, the disk drive functions normally as the data is retrieved.

It should also be noted that it has been observed that error rates are generally lower when the data is retrieved at a lower data rate. Therefore, data which needs to be stored and recovered with an intrinsic lower error rate would benefit from lower disk speed operation. Given that the damage potential for head-disk crash is lower at reduced disk rotation speeds, as discussed earlier, device reliability gains can be expected when the disk rotation speed is lowered.

Therefore, in a storage array environment which may be dedicated to data which can be recorded and retrieved at a lower rate and also requires a lower error rate, the data may be organized so that the disk drive RPM gradually increases as data is added toward the inner diameter (ID) beginning at the outer diameter (OD), thereby keeping the effective data rate approximately constant and the damage potential low.

As examples of the sequence of steps that would occur in accordance with the invention in a PDA or cellular phone, the following methods are outlined:

Network Data Receive Steps

Figure 5:
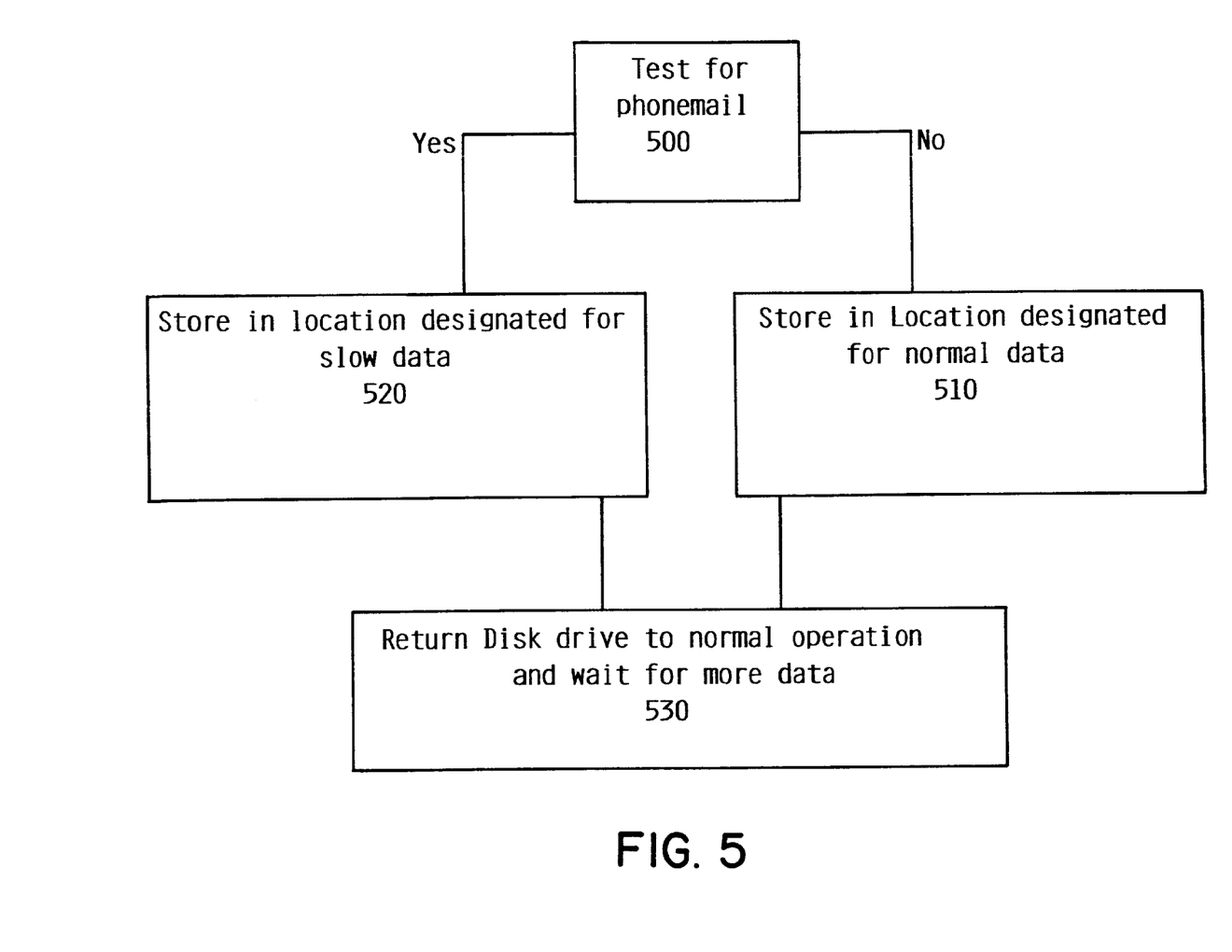
FIG. 5 illustrates a flow chart for network data receive steps according to an exemplary embodiment of the invention.

Referring to FIG. 5, when data is received from the network for storage, according to the invention, the data is first tested to determine if it is phonemail (or any other type of data identified as one that can be effectively transferred with a slow drive), in block 500. If the data is not phonemail in block 510, then the data is stored on the disk at the locations designated for normal use. The system then continues to wait for more data in block 530.

If the data is phonemail in block 520, the data is stored on the disk at the locations designated for slow use. After the phonemail has been stored, the system returns to normal operation and waits for more data in block 530.

Phonemail Playback Steps

Figure 6:
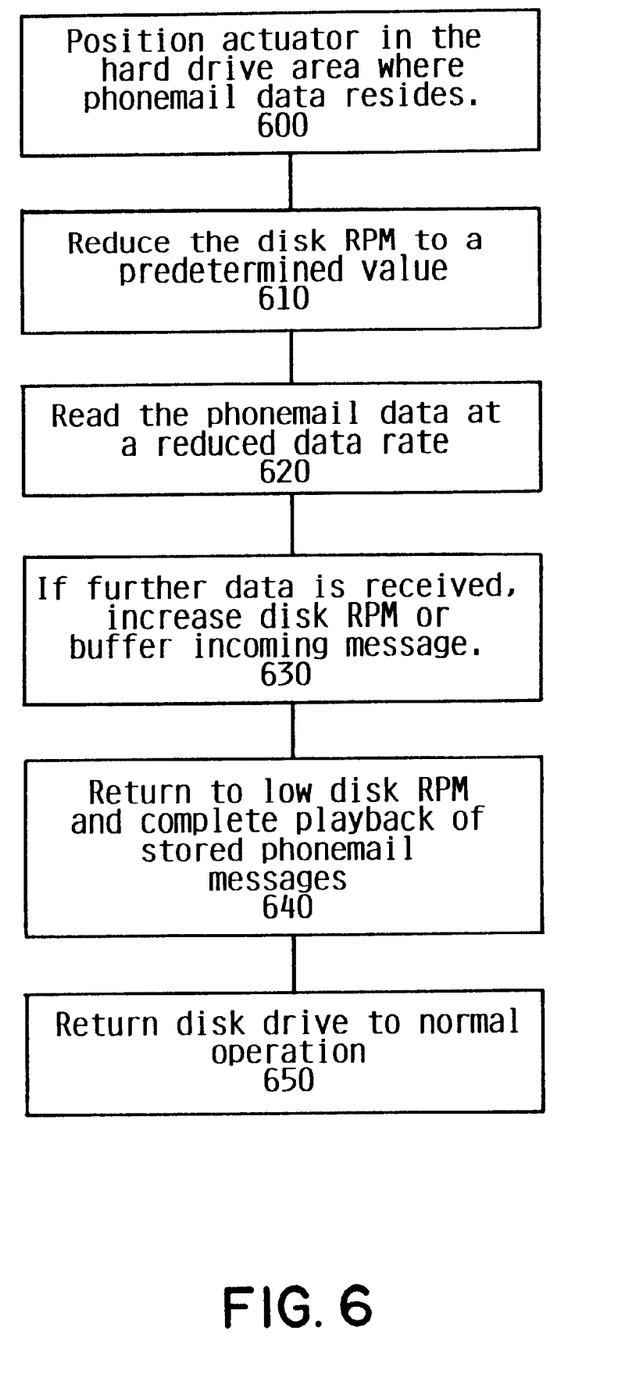
FIG. 6 illustrates a flow chart for phonemail playback steps according to an exemplary embodiment of the invention.

Referring to FIG. 6, when the user requests the playback of the stored phonemail, the drive positions the hard drive actuator to the location where the stored phonemail has been recorded in block 600. The spindle motor spins the disk at a predetermined reduced rate in block 610. The data is retrieved from the disk at a reduced data rate and transferred to the system which plays the data as an audible message in block 620.

While data is being retrieved from the disk at a reduced data rate in block 620, an incoming message which needs to be stored may arrive. If the incoming message is small enough to be buffered, the playback of the data can continue without pause while the incoming message is placed in memory for later storage in block 630. If the incoming message is too large to buffer, the disk drive could abandon the playback of the original data in block 630. Increasing the drive speed would allow the incoming message to be stored normally, and when the storage is accomplished, the drive could be slowed again to continue the playback of the original data in block 640. Alternatively, the disk drive could buffer the data being played back for continued play back while storing the incoming data on the disk.

Once the phonemail playback is complete, return disk drive to normal operation 650.

Saving Phonemail to Disk by User

Figure 7:
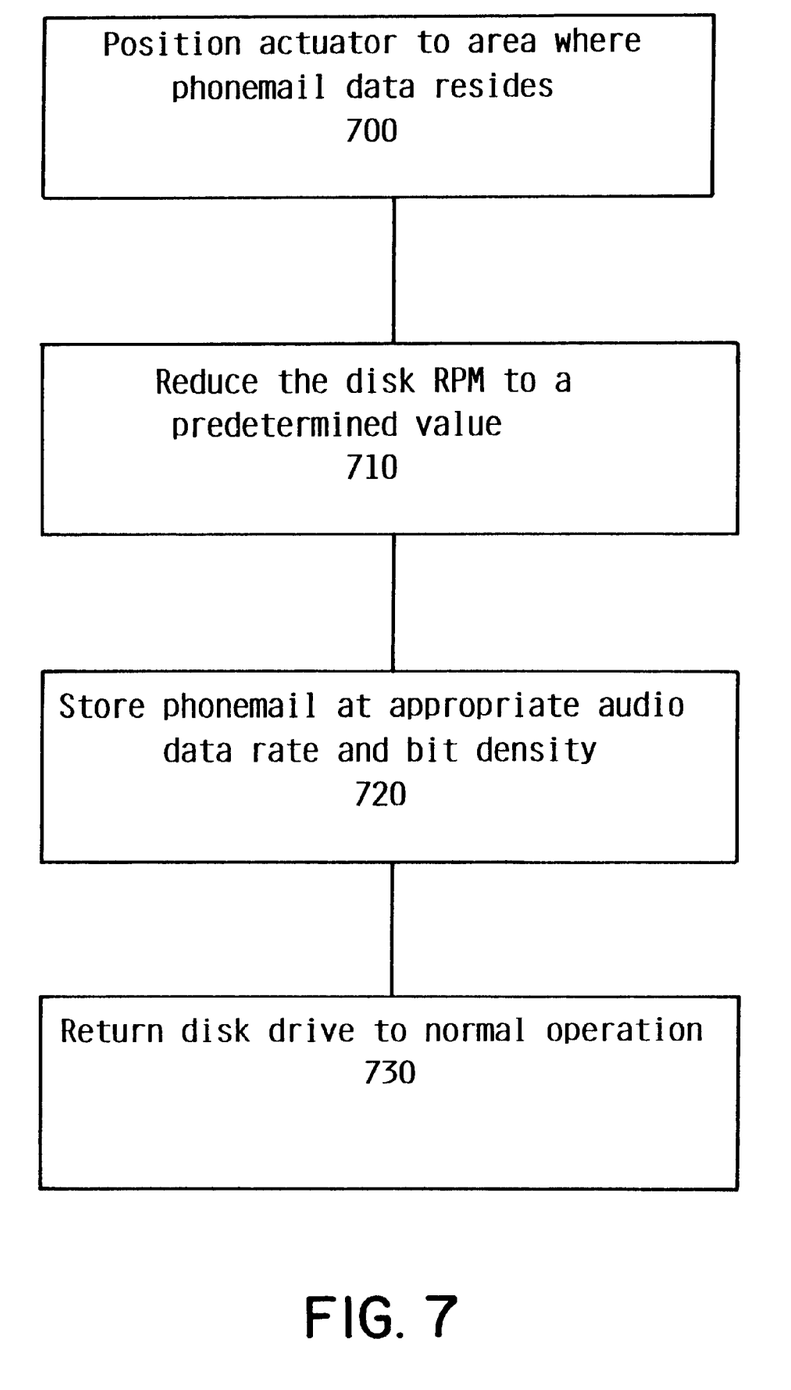
FIG. 7 illustrates a flow chart for saving phonemail to disk by user according to an exemplary embodiment of the invention.

Referring to FIG. 7, in order to save a phonemail message to the disk for later transmission, the drive positions the hard drive actuator to the location designated for slow use 700. The spindle motor spins the disk at a predetermined reduced rate in block 710. The data is stored to the disk at a reduced data rate in block 720. After the phonemail message is saved, return the disk drive to normal operation in block 730.

It is comprehended that the invention may be embodied as a computer program product. The term computer program product includes a recording medium, such as a floppy disk, a high capacity read only memory in the form of an optically read compact disk or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiments, this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A method of storing data, there being a plurality of different types of data, on a moving storage medium having a first surface opposite a second surface and having a plurality of different predetermined traveling speeds comprising:

determining whether data to be stored is of a first type;

determining a location on the moving storage medium at which to store the data according to the determined data type, wherein the location is within a first region on the first surface of the moving storage medium if the data is determined to be the first type and the location is within a second region on the first surface of the moving storage medium if the data is determined not to be the first type, and wherein the first and second regions are mutually exclusive;

operating the moving storage medium at a predetermined traveling speed associated with the determined data type; and     storing the data at the determined location on the moving storage medium;

wherein the moving storage medium is a disk medium and the first and second regions are respectively outside and inside diameter regions of the disk medium;

wherein the first type of data comprises at least one of audio data, phonemail, a text message;

if the data is determined to be the first type, then the predetermined traveling speed comprises a relatively low traveling speed; and     if the data is determined not to be the first type, then the predetermined traveling speed comprises a normal traveling speed.

2. The method according to claim 1, wherein the plurality of data types are distinguished based on what minimum storage medium traveling speed can be effectively used when reading out the stored data.

3. The method according to claim 2, wherein said operating comprises operating the moving storage medium at a relatively low traveling speed.

4. The method according to claim 2, wherein said operating comprises operating the moving storage medium at a normal traveling speed.

5. The method according to claim 2, wherein said data comprises audio data;

and wherein said predetermined traveling speed comprises a relatively low traveling speed.

6. The method according to claim 2, wherein said data comprises phonemail;

and wherein said predetermined traveling speed comprises a relatively low traveling speed.

7. The method according to claim 2, wherein said data comprises a text message;

and wherein said predetermined traveling speed comprises a relatively low traveling speed.

8. The method according to claim 2, wherein said data comprises video;

and wherein said predetermined traveling speed comprises a normal traveling speed.

9. A method of retrieving data which has been stored according to the method of storing of claim 1, comprising:

determining a type of stored data to be retrieved;

determining a location on the moving storage medium where the stored data is located;

operating the moving storage medium at a predetermined traveling speed associated with the determined data type; and     retrieving the stored data from the determined location on the moving storage medium.

10. The method according to claim 9, wherein said predetermined traveling speed comprises a relatively low traveling speed.

11. The method according to claim 9, wherein said predetermined traveling speed comprises a normal traveling speed.

12. The method according to claim 9, wherein said data comprises audio data;

and wherein said predetermined traveling speed comprises a relatively low traveling speed.

13. The method according to claim 9, wherein said data comprises phonemail and wherein said predetermined traveling speed comprises a relatively low traveling speed.

14. The method according to claim 9, wherein said data comprises video;

and wherein said predetermined traveling speed comprises a normal speed.

15. A method of retrieving data which has been stored according to a method of storing data, there being a plurality of different types of data, on a moving storage medium having a first surface opposite a second surface and having a plurality of different predetermined traveling speeds, the method of storing data comprising:

determining whether data to be stored is of a first type;

determining a location on the moving storage medium at which to store the data according to the determined data type, wherein the location is within a first region on the first surface of the moving storage medium if the data is determined to be the first type and the location is within a second region on the first surface of the moving storage medium if the data is determined not to be the first type, and wherein the first and second regions are mutually exclusive;

operating the moving storage medium at a predetermined traveling speed associated with the determined data type; and     storing the data at the determined location on the moving storage medium; the method of retrieving data comprising:

determining a type of stored data to be retrieved;

determining a location on the moving storage medium where the stored data is located;

operating the moving storage medium at a predetermined traveling speed associated with the determined data type;

retrieving the stored data from the determined location on the moving storage medium;

receiving a data message while said retrieving the stored data is being performed at the relatively low speed;

determining the size of the data message;

writing the data message in memory while said retrieving of the stored data is being performed if the data message is determined to be smaller than an available memory; and     if the data message is determined to be larger than the available memory, then halting the retrieving of said stored data from the moving storage medium, increasing the traveling speed of the moving storage medium to a speed associated with the data message type, storing the data message, decreasing the traveling speed of the moving storage medium and continuing the retrieving of said stored data from the moving storage medium.

16. A direct access storage device for storing data comprising:

a recording medium having a first surface opposite a second surface and having a plurality of predetermined storage locations;

a motor having a plurality of different predetermined motor speeds to rotate the medium; and a controller;

wherein the controller determines whether data to be stored is a first type from among a plurality of different types of data, determines a predetermined storage location for the determined data type, determines a predetermined motor speed for the determined data type, and stores the data at the predetermined storage location at the predetermined motor speed, wherein the predetermined storage location is within a first region on the first surface of the recording medium if the data is determined to be the first type and the predetermined storage location is within a second region on the first surface of the recording medium if the data is determined not to be the first type, and wherein the first and second regions are mutually exclusive;

wherein the recording medium is a disk medium and the first and second regions are respectively outside and inside diameter regions of the disk medium;

wherein the first type of data comprises at least one of audio data, phonemail, a text message;

if the data is determined to be the first type, then the predetermined motor speed comprises a relatively low motor speed; and if the data is determined not to be the first type, then the predetermined motor speed comprises a normal motor speed.

17. The direct access storage device according to claim 16, wherein the controller further determines what type of data is to be read from a plurality of different types of data, determines a predetermined motor speed for the determined data type, determines the location on the medium where the data to be read is stored, and reads the data from the location on the medium at the predetermined motor speed.

18. The direct access storage device according to claim 16, wherein the plurality of data types are distinguished by what motor speed can be effectively used when reading the stored data.

19. The direct access storage device according to claim 18, wherein said data comprises audio data;

and wherein said predetermined motor speed comprises a relatively low motor speed.

20. The direct access storage device according to claim 18, wherein said data comprises phonemail;

and wherein said predetermined motor speed comprises a relatively low motor speed.

21. The direct access storage device according to claim 18, wherein said data comprises video data;

and wherein said predetermined motor speed comprises a normal motor speed.

22. An article of manufacture comprising a computer program product, the computer program product comprising means for causing a computer to provide a method of storing data, there being a plurality of different types of data, on a moving storage medium having a first surface opposite a second surface and having a plurality of different predetermined traveling speeds, the method including:

determining whether data to be stored is of a first type;

determining a location on the moving storage medium at which to store the data according to the determined data type, wherein the location is within a first region on the first surface of the moving storage medium if the data is determined to be the first type and the location is within a second region on the first surface of the moving storage medium if the data is determined not to be the first type, and wherein the first and second regions are mutually exclusive;

operating the moving storage medium at a predetermined traveling speed associated with the determined data type; and storing the data at the determined location on the moving storage medium;

wherein the moving storage medium is a disk medium and the first and second regions are respectively outside and inside diameter regions of the disk medium;

wherein the first type of data comprises at least one of audio data, phonemail, a text message;

if the data is determined to be the first type, then the predetermined traveling speed comprises a relatively low traveling speed; and if the data is determined not to be the first type, then the predetermined traveling speed comprises a normal traveling speed.

23. An article of manufacture according to claim 22, wherein the plurality of data types are distinguished based on what minimum storage medium traveling speed can be effectively used when reading out the stored data.

24. An article of manufacture according to claim 23, wherein said data comprises audio data;

wherein said predetermined traveling speed comprises a relatively low traveling speed.

25. An article of manufacture according to claim 23, wherein said data comprises phonemail;

wherein said predetermined traveling speed comprises a relatively low traveling speed.

26. An article of manufacture according to claim 23 wherein said data comprises video;

wherein said predetermined traveling speed comprises a normal traveling speed.

27. An article of manufacture according to claim 22, further comprising means for causing a computer to provide a method of retrieving data which has been stored according to the provided method of storing, the method of retrieving including:

determining a type of stored data to be retrieved;

determining a location on the moving storage medium where the stored data to be retrieved is located;

operating the moving storage medium at the predetermined traveling speed associated with the determined data type; and retrieving the stored data from the determined location on the moving storage medium.

28. An article of manufacture according to claim 27, wherein said data comprises audio data;

wherein said predetermined traveling speed comprises a relatively low traveling speed.

29. An article of manufacture according to claim 27, wherein said data comprises phonemail;

wherein said predetermined traveling speed comprises a relatively low traveling speed.

30. An article of manufacture according to claim 27, wherein said data comprises video;

wherein said predetermined traveling speed comprises a normal traveling speed.

31. An article of manufacture comprising a computer program product, the computer program product comprising means for causing a computer to provide a method of storing data, there being a plurality of different types of data, on a moving storage medium having a first surface opposite a second surface and having a plurality of different predetermined traveling speeds, the method including:

determining whether data to be stored is of a first type;

determining a location on the moving storage medium at which to store the data according to the determined data type, wherein the location is within a first region on the first surface of the moving storage medium if the data is determined to be the first type and the location is within a second region on the first surface of the moving storage medium if the data is determined not to be the first type, and wherein the first and second regions are mutually exclusive;

operating the moving storage medium at a predetermined traveling speed associated with the determined data type; and storing the data at the determined location on the moving storage medium; further comprising means for causing a computer to provide a method of retrieving data which has been stored according to the provided method of storing, the method of retrieving including:

determining a type of stored data to be retrieved;

determining a location on the moving storage medium where the stored data to be retrieved is located;

operating the moving storage medium at the predetermined traveling speed associated with the determined data type; and retrieving the stored data from the determined location on the moving storage medium; further comprising means for causing a computer to provide a method of interrupting the provided method of retrieving, the method of interrupting including:

receiving a data message while said retrieving the stored data is being performed at a relatively low speed;

determining the size of the data message;

writing the data message in memory while said retrieving of the stored data is being performed if the data message is determined to be smaller than an available memory; and if the data message is determined to be larger than the available memory, then halting the retrieving of said stored data from the moving storage medium, increasing the traveling speed of the moving storage medium to a speed associated with the data message data type, storing the data message, decreasing the traveling speed of the moving storage medium and continuing the retrieving of said stored data from the moving storage medium.

\* \* \* \* \*

UNITED STATES PATENT AND TRADEMARK OFFICE
CERTIFICATE OF CORRECTION

PATENT NO.    : 6,400,892 B1
DATED         : June 4, 2002
INVENTOR(S)   : Gordon J. Smith It is certified that error appears in the above-identified patent and that said Letters Patent is hereby corrected as shown below:

<u>Title page,</u>
Item [54], in the Title: replace "ADAPTIVE DISK DRIVE OPERATION" with
-- ADAPTIVE DISK DRIVE OPERATION WITH MEDIUM SPEED AND RECORDING LOCATION BASED ON DATA TYPE --

Signed and Sealed this

Twenty-second Day of October, 2002

*Attest:*

*Attesting Officer*

JAMES E. ROGAN
*Director of the United States Patent and Trademark Office*